US007187403B2

(12) United States Patent
Gu et al.

(10) Patent No.: US 7,187,403 B2
(45) Date of Patent: Mar. 6, 2007

(54) METHOD OF SETTING AN ENVIRONMENT FOR A PORTABLE DATA STORAGE DEVICE BY USING A COMPUTER AND A PORTABLE DATA STORAGE DEVICE EMPLOYING THE METHOD

(75) Inventors: Dong-youp Gu, Suwon (KR); Yong-ho Kim, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1211 days.

(21) Appl. No.: 10/061,347

(22) Filed: Feb. 4, 2002

(65) Prior Publication Data

US 2002/0114611 A1 Aug. 22, 2002

(30) Foreign Application Priority Data

Feb. 5, 2001 (KR) ................................ 2001-5463

(51) Int. Cl.
*H04N 5/00* (2006.01)
*H04N 5/91* (2006.01)
*H04N 5/225* (2006.01)
*H04N 5/232* (2006.01)
*G06F 13/38* (2006.01)

(52) U.S. Cl. ................................ 348/207.1; 348/211.4; 386/46; 710/64; 710/65; 710/73; 710/74

(58) Field of Classification Search ............ 348/207.1, 348/211.8, 211.9, 211.14, 239; 386/46; 710/1, 62–74

See application file for complete search history.

(56) References Cited

U.S. PATENT DOCUMENTS 5,528,560 A 6/1996 Ogiyama
5,805,530 A 9/1998 Youngberg
6,023,769 A * 2/2000 Gonzalez .................... 713/400

(Continued)

FOREIGN PATENT DOCUMENTS

DE 19909131 9/2000

(Continued)

OTHER PUBLICATIONS

Patent Abstract of Japan, 2000138860, May 16, 2000.

(Continued)

*Primary Examiner*—Thai Tran
*Assistant Examiner*—Mishawn Dunn
(74) *Attorney, Agent, or Firm*—Staas & Halsey LLP

(57) ABSTRACT

A portable data storage device, e.g., a digital video camcorder (DVC), which stores environment setting data including time data and has an interface which enables a mutual data transmission with an external host computer. Video and audio data are transmitted and received between the DVC and the computer through the interface, and various control data for controlling the DVC and environment setting data are also transmittable from the computer to the DVC. Where the computer transmits the environment setting data to the DVC, the DVC stores the received data in a storage portion. Accordingly, without complicated manipulation of a plurality of keys on the DVC, a user easily inputs data related to the environment setting of the DVC from the computer. Where time data is provided to the DVC from a time standard, accurate current time according to the time standard is recorded on a magnetic tape during recording.

36 Claims, 7 Drawing Sheets

U.S. PATENT DOCUMENTS

| | | | | |
|---|---|---|---|---|
| 6,279,061 | B1 * | 8/2001 | Aoki et al. | 710/65 |
| 6,980,233 | B1 * | 12/2005 | Hirasawa | 348/207.1 |

FOREIGN PATENT DOCUMENTS

| | | |
|---|---|---|
| EP | 0659017 | 6/1995 |
| EP | 748132 | 6/1996 |
| EP | 0745132 | 7/1996 |
| EP | 0864984 | 3/1998 |
| EP | 0971529 | 1/2000 |
| EP | 0977431 | 2/2000 |
| EP | 1049326 | 11/2000 |

OTHER PUBLICATIONS

Patent Abstract of Japan, 10285501, Oct. 23, 1998.

* cited by examiner

FIG.5

| COMMAND | | | | RESPONSE SIGNAL | | | |
|---|---|---|---|---|---|---|---|
| OPC | | OPRs | | OPC | | OPRs | |
| CURRENT TIME | 80 | YEAR | XX | CURRENT TIME | 80 | YEAR | XX |
| | | MONTH | XX | | | MONTH | XX |
| | | DAY | XX | | | DAY | XX |
| | | HOUR | XX | | | HOUR | XX |
| | | MINUTE | XX | | | MINUTE | XX |
| | | SECOND | XX | | | SECOND | XX |

METHOD OF SETTING AN ENVIRONMENT FOR A PORTABLE DATA STORAGE DEVICE BY USING A COMPUTER AND A PORTABLE DATA STORAGE DEVICE EMPLOYING THE METHOD

CROSS REFERENCE TO RELATED APPLICATIONS

This application claims the benefit of Korean Application No. 2001-5463 filed Feb. 5, 2001, in the Korean Patent Office, the disclosure of which is incorporated herein by reference.

BACKGROUND OF THE INVENTION

1. Field of the Invention

The present invention relates to a method of setting an environment for a portable data storage device, e.g., a digital video camcorder, a personal digital assistant (PDA), a portable music player, or the like, and more particularly, to a method of setting an environment for a portable data storage device for an easy setting of the environment without requiring a complicated key manipulation on the portable device, by transmitting environment setting data through a host computer.

2. Description of the Related Art

Generally, portable data storage devices receive, store and reproduce data, typically in the form of digital signals. For example, a digital video camcorder (hereinafter called DVC) records and reproduces video and audio data. The DVC has advantages over an analog type device in terms of high video and audio quality and easy storage and editing. To satisfy a demand for a more compact-sized portable device, a number of operational keys on an operation panel of the portable device is reduced and simplified. At the same time, to satisfy a demand for a portable device with more functions available, the same one key is set to correspond to a plurality of functions. requiring the user to typically manipulate a particular sequence of keys several times to select a desired function, and usually needs more than several times of trial and error until the user learns to manipulate the key buttons efficiently. The complicated and non-intuitive input interface of the portable devices described above, while contributing greatly to the compact size and the portability of the portable devices, is not as convenient as a more extensive input interface, e.g., a full keyboard, a mouse, or the like, provided in a personal computer (PC).

While it is generally known that a portable device may be made to connect with and to exchange data to and from a host computer, e.g., a PC, unfortunately, the data allowed to be exchanged is limited to application related data, e.g., the audio/video data in the case of the DVC; contact, schedule and/or appointment data of a PDA; or one or more music files in the case of a portable music player, e.g., an MP3 player, etc. Accordingly, a user must still use the less convenient input interface of the portable device in order to set the operation environment, e.g., the configuration setting preference, the time and date setting or the like, of the portable device itself.

In many cases, while accessing the application related data is sufficiently intuitive, to set or reconfigure the environment setting relating to the configuration of the operating environment of the portable device is less frequently performed, and is thus relatively less intuitive. By way of example, a user of a DVC may encounter difficulty in setting a recording/reproducing method selection, a video/audio recording pattern selection, and a time setting selection, using the input buttons of the DVC.

SUMMARY OF THE INVENTION

The present invention has been made to overcome the above-mentioned problems of the related art, and accordingly, an object of the present invention is to provide a method of setting the environment for a digital video camcorder for inputting environment setting data, such as for example, time data by using a host computer.

Additional objects and advantages of the invention will be set forth in part in the description which follows, and, in part, will be obvious from the description, or may be learned by practice of the invention.

According to an aspect of the principles of the present invention, a method of setting the environment for a portable data storage device that has an interface for interfacing with a host computer thereby enabling a mutual data transmission with the host computer, comprises: assigning an environment setting command code to at least one code in a reserved area that is not in use in a code area available for assignment of commands for the mutual data transmission between the portable device and the host computer via the interface; preparing an operation code area and an operand area in a command frame transmitted between the host computer and the portable device, the operation code area containing the environment setting command code, the operand area containing environment setting data corresponding to the environment setting command code; determining whether the code contained in the operation code area of the command frame is the environment setting command code where the command frame is transmitted from the host computer to the portable device; and upon determining the code contained in the operation code area of the command frame being the environment setting command code, updating the existing environment setting data of the portable device with the environment setting data contained in the operand area.

By way of an example, and not as a limitation, the environment setting commands may be a time setting command while the environment setting data may be the time data corresponding to the time setting command. The time data may be the data relating to the time keeping in the host computer, which in turn may sometimes be downloaded from a remote time server that provides the standard time data, over the Internet or the like.

In the DVC example, the time data may be used as the time stamp recorded in a time recording sector of a magnetic tape during a recording.

According to an aspect of the principles of the present invention, the environment setting data, such as for example, the time data, is easily inputted to the portable device by using the host computer. Accordingly, without complicated manipulation of key buttons of the portable device, the environments configuration for the portable device can be set.

According to another aspect of the principles of the present invention, a digital video camcorder comprises an interface which enables mutual transmission of digital data with a host computer; a microcomputer which counts a current time based on time data transmitted from the host computer via the interface. In an embodiment according to the principles of the present invention, the digital video camcorder may also comprises a head which records audio/video data on a magnetic tape during audio/video data recording and records the current time counted by the microcomputer on a predetermined part of the magnetic tape.

BRIEF DESCRIPTION OF THE DRAWINGS

The above and other objects and features of the present invention will become apparent from the following description of an embodiment thereof given in conjunction with the accompanying drawings, in which:

FIG. 5 is a view showing an example of OPC and operand (OPR) regarding time data;

DESCRIPTION OF THE PREFERRED EMBODIMENTS

Figure 1:
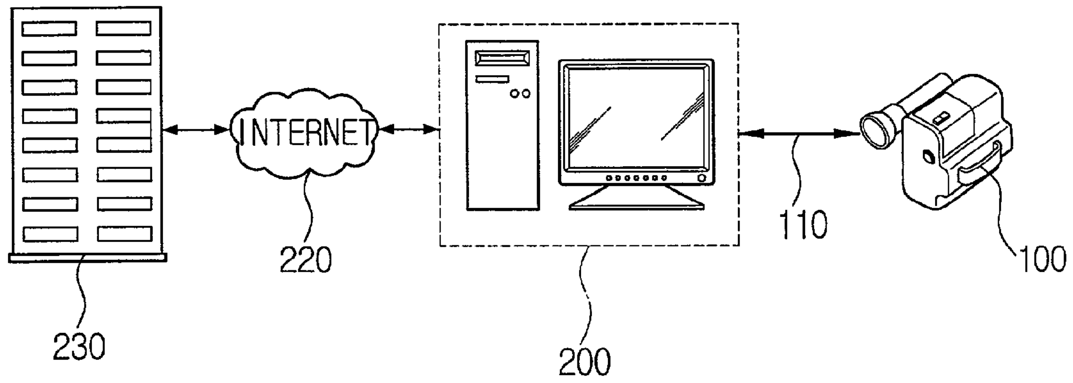
FIG. 1 is a view showing a connection between a digital video camcorder and a personal computer for accomplishing an environment setting method according to the present invention.

Reference will now be made in detail to the present embodiments of the present invention, examples of which are illustrated in the accompanying drawings, wherein like reference numerals refer to like elements throughout.

For simplicity and illustrative purposes, the principles of the present invention are described herein by referring mainly to a digital video camcorder. However, one of ordinary skill in the art would readily recognize that the same principles are equally applicable to and can be implemented for any other portable data storage device that is connectable and able to synchronize with a host computer.

Figure 2:
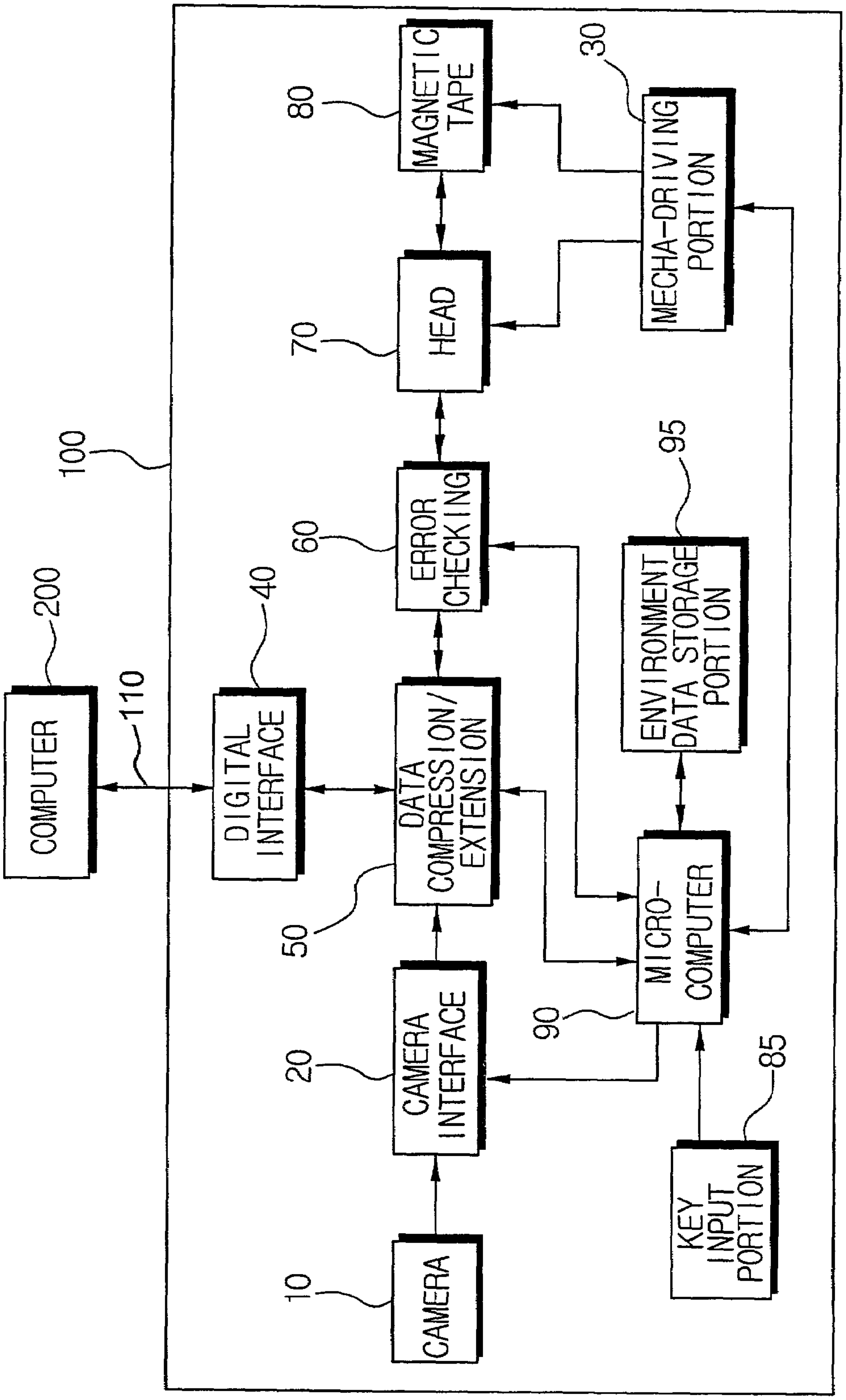
FIG. 2 is a detailed block diagram of the connection between the digital camcorder and the personal computer shown in FIG. 1.

FIG. 1 shows a connection between a digital video camcorder (DVC) 100 and a personal computer (PC) 200 (hereinafter computer 200) which accomplishes the environment setting method according to the present invention, and FIG. 2 is a detailed block diagram of the connection between the DVC 100 and the computer 200 shown in FIG. 1. As shown in FIG. 1, the DVC 100 is connected to the computer 200, and the computer 200 is connected to a time server 230 via the Internet 220.

The DVC 100 comprises a microcomputer 90 which controls overall operation of sub-devices, a key input portion 85 through which a user inputs various control commands regarding operation of the DVC 100, a camera 10 which photographs an image and acquires the sound of an object to obtain video and audio data of the object, a camera interface 20 which interfaces between the microcomputer 90 and the camera 10, a magnetic tape 80 which stores the video and audio data obtained by the camera 10 and additional data, a head 70 which records data on the magnetic tape 80 and reproduces recorded data from the magnetic tape 80, a mechanical-driving portion 30 which drives a mechanical operation of the head 70 and the magnetic tape 80, an error checking portion 60 which checks an error in the signal read by the head 70 and in the signals to be recorded on the magnetic tape 80, and a data compressing/extending portion 50 which compresses output data of the camera interface 20 and decompresses the data read by the head 70.

The DVC 100 further comprises an environment data storage portion 95, which stores environment setting data, and a digital interface 40 which provides an interface between the computer 200 and the DVC 100 so that digital data is receivable from the computer 200 and storable in the environment data storage portion 95. The computer 200 is connected to the digital interface 40 of the DVC 100 through, e.g., a cable 110 to mutually transmit data between the computer 200 and the DVC 100.

The environment data storage portion 95 preferably employs a non-volatile memory to prevent erasure of data during power cut-off.

The digital interface 40 between the DVC 100 and the computer 200 communicates data including video and/or audio data between the DVC 100 and the computer 200. For example, data of the image and/or sound acquired by the DVC 100 is transmitted to the computer 200 via the digital interface 40. The data of an image and/or sound edited or pre-stored in the computer 200 is also transmitted to the DVC 100 for reproducing via the digital interface 40. Further, the computer 200 transmits control data to the DVC 100 to control respective operations of the DVC 100, such as for example, recording, reproducing, fast forward, rewind, etc.

For a data communication between the computer 200 and the DVC 100, a separate communication protocol is defined, such as for example the IEEE-1394 protocol. The IEEE-1394 protocol specifies various control commands to control the respective devices by using the computer 200, according to which the operation of the DVC 100 is controlled through the computer 200. It should be, however, understood and readily apparent to those skilled in the art that any other communication protocol may be utilized, and that the use of such other protocols would nevertheless be within the spirit of the present invention.

Figure 3:
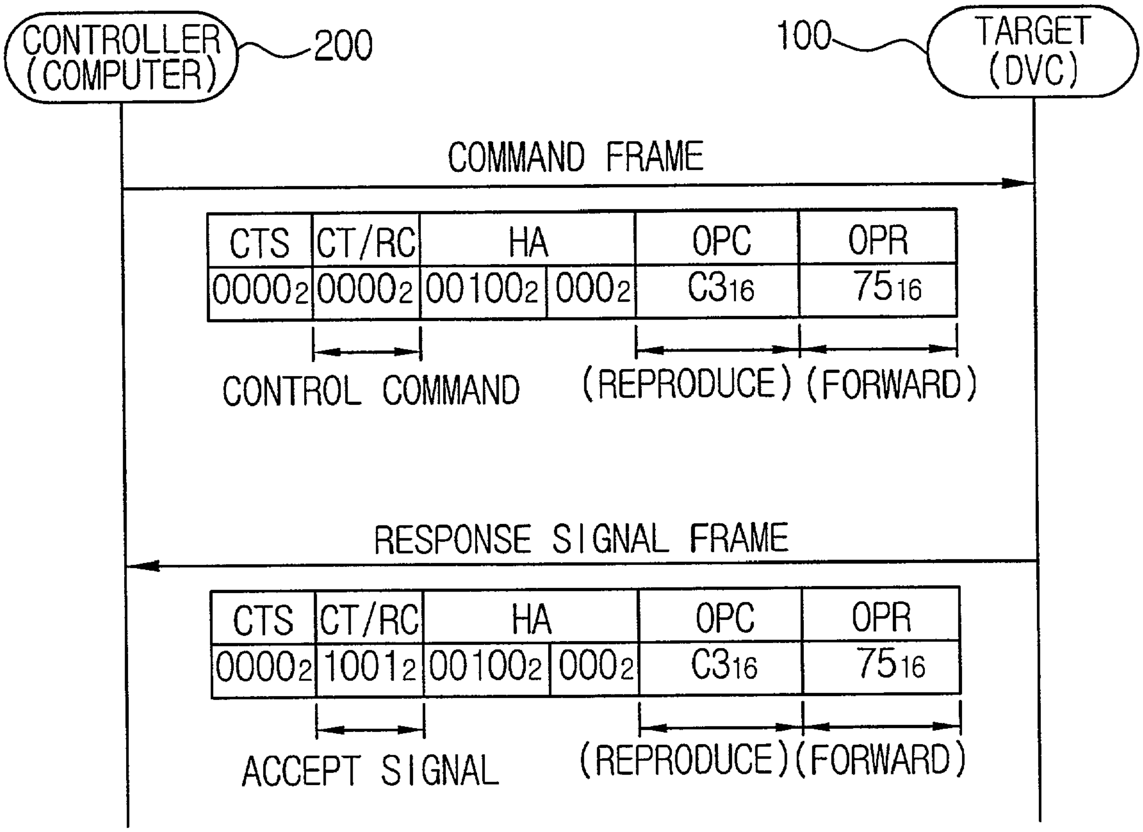
FIG. 3 is a view showing one example of a command frame of a code defined in an IEEE-1394 protocol.

FIG. 3 shows one example of a command frame transmitted between the computer 200 and the DVC 100 according to the current IEEE-1394 protocol. The IEEE-1394 protocol defines a device that sends a control command as a controller, and a device that receives the control command from the controller as a target. As shown in FIG. 3, the computer 200 corresponds to the controller while the DVC 100 corresponds to the target. The IEEE-1394 protocol specifies a structure of the command frame transmitted between the controller and the target, the relevant portions of which will now be described in greater detail, and in reference to FIG. 3.

In the current IEEE-1394 protocol, each command frame contains five code fields, i.e., a command and transaction set (CTS) field, a command type/response code (CT/RC) field, a header address (HA) field, an operation code (OPC) field and an operand (OPR) field.

The CTS field indicates types of control command. For example, when the CTS field equals $0000_2$ as shown in FIG. 3, the command frame is an audio/video control (A/VC) frame. Accordingly, when the computer 200 transmits to the DVC 100 a control command for controlling the sub-devices of the DVC 100, which is an audio/video device, the CTS field is always assigned the value $0000_2$.

The CT/RC field indicates whether the frame is a command from the computer 200 or a response code from the DVC 100, and also indicates the category of the commands transmitted. More specifically, if the most significant bit (MSB) of the CT/RC field is zero (0), the frame is a command frame from the computer 200. If the MSB of the CT/RC field is one (1), the frame is a response code transmitted from the DVC 100. If the CT/RC field equals to $0000_2$, the command from the computer 200 is categorized as a control command, and, if the CT/RC field equals to $1001_2$, the response code from the DVC 100 is categorized as an accept signal to the command frame from the computer 200.

The HA field has a code that specifies the target device or one of sub-devices in the target device, which is the object of the control. For example, if the code of the HA field equals to $00100_2$, it specifies a video cassette recorder as the object of the control.

The OPC field has a code that specifies detailed operation of the device or a sub-device, and the OPR field has a parameter corresponding to the OPC field. The OPC and OPR fields are the primary contents of the frame regarding a command or a response. In the command frame having the CTS (=$0000_2$) for the audio/video control (AV/C), the OPC field is assigned with one (1) byte and the OPR field is assigned with more than one (1) byte. For example, if the OPC is '$C3_{16}$' and the OPR is '$75_{16}$', the OPC indicates a 'forward reproducing'. Accordingly, where the DVC 100 receives the command frame shown in FIG. 3 from the computer 200, the DVC 100 generates a response frame by converting the code of the CT/RC field into a code indicating the frame as a response frame and maintaining codes of remaining fields at the same values as the initial values in the received command frame, and transmits the newly generated response frame to the computer 200. Where determining that the response frame has the code corresponding to the command frame that the computer 200 transmitted, the computer 200 determines the frame as a normal transmission of the command, and performs the forward reproducing of the DVC 100.

Figure 4:
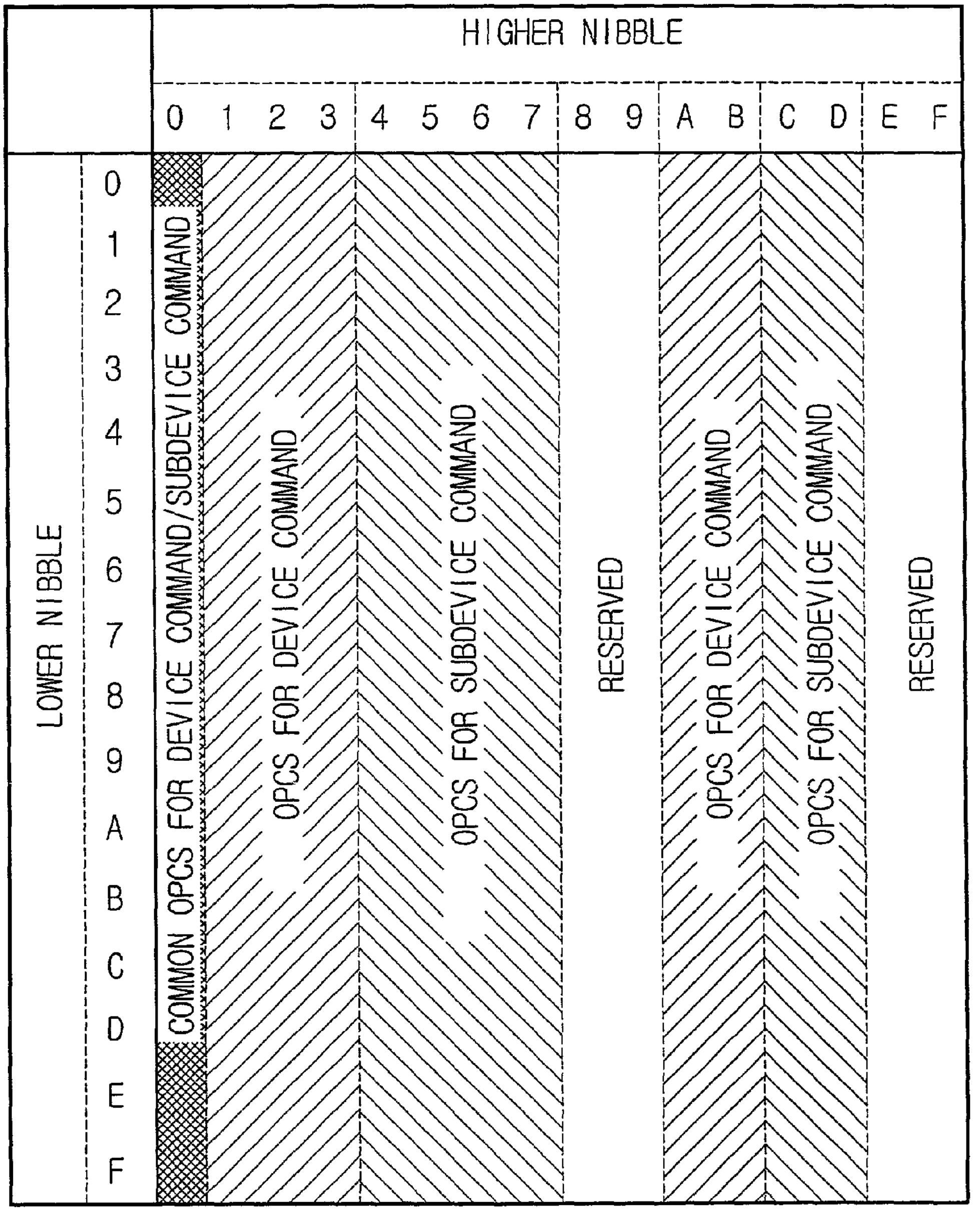
FIG. 4 is a view showing an operation code (OPC) mapping currently defined in the IEEE-1394 protocol.

FIG. 4 shows an OPC map defined by the current IEEE-1394 protocol. One (1) byte code of the OPC field consists of four-bit higher nibble and four-bit lower nibble. The one (1) byte OPC is a combination of an upper nibble and a lower nibble, and corresponds to a command code representing each different command.

Referring to FIG. 4, no command corresponds to the fields of higher nibble of $8_{16}$, $9_{16}$, $E_{16}$ and $F_{16}$. The $8_{16}$, $9_{16}$, $E_{16}$ and $F_{16}$ fields are reserved fields, which are not presently used to define a command. Accordingly, in an exemplary embodiment of the present invention, in order to re-define an environment setting command from the computer 200, the code values of the reserved field are used to define the environment setting commands OPC. If the OPC field contains an environment setting command, the OPR field contains data associated with the environment setting command.

The contents of the OPC and OPR fields for an exemplary environment setting command are shown in FIG. 5. As shown in FIG. 5, "COMMAND" represents a part of a frame transmitted from the computer 200 to the DVC 100, and RESPONSE SIGNAL represents a part of a frame transmitted from the DVC 100 to the computer 200. In the example shown in FIG. 5, the OPC and OPR are especially related to a time setting command among the environment setting commands. In the OPC mapping shown in FIG. 4, a code $80_{16}$ in the reserved field is defined as the OPC for a time setting command. That is, where the OPC is '$80_{16}$', the OPC indicates that data representing the current time is being transmitted. Also, the OPR field contains data about the year, the month, the day, the hour, the minute and the second corresponding to the current time. The data about the year contains values ranging from '00' to '99', the month from '01' to '12', the day from '01' to '31', the hour from '00' to '23', the minute from '00' to '59' and the second from '00' to '59'. The OPR field is assigned a proper amount of bits necessary to hold data about the year, the month, the day, the hour, the minute and the second.

A structure of the response frame is identical with a structure of the command frame. The response frame is transmitted from the DVC 100 to the computer 200 to confirm reception of the command frame, and accordingly, the computer 200 determines that the command frame is transmitted to the DVC 100 without an error if the computer receives the response frame having the same OPC and OPR as those of the command frame.

FIG. 5 shows the OPC and OPR for time data transmission by way of example only, however, other data for the environment setting are transmittable, by appropriately assigning the OPC with other codes in the reserved field (e.g., code '$81_{16}$') and by defining the corresponding codes of the OPR.

By using codes in the reserved field to define commands for the environment setting, configuring the environment for the DVC 100 is accomplished, without any conflict with other commands for performing functions of the IEEE-1394 protocol. Alternatively, codes for environment settings may be independently defined and used, without the use of the IEEE-1394 protocol.

Figure 6:
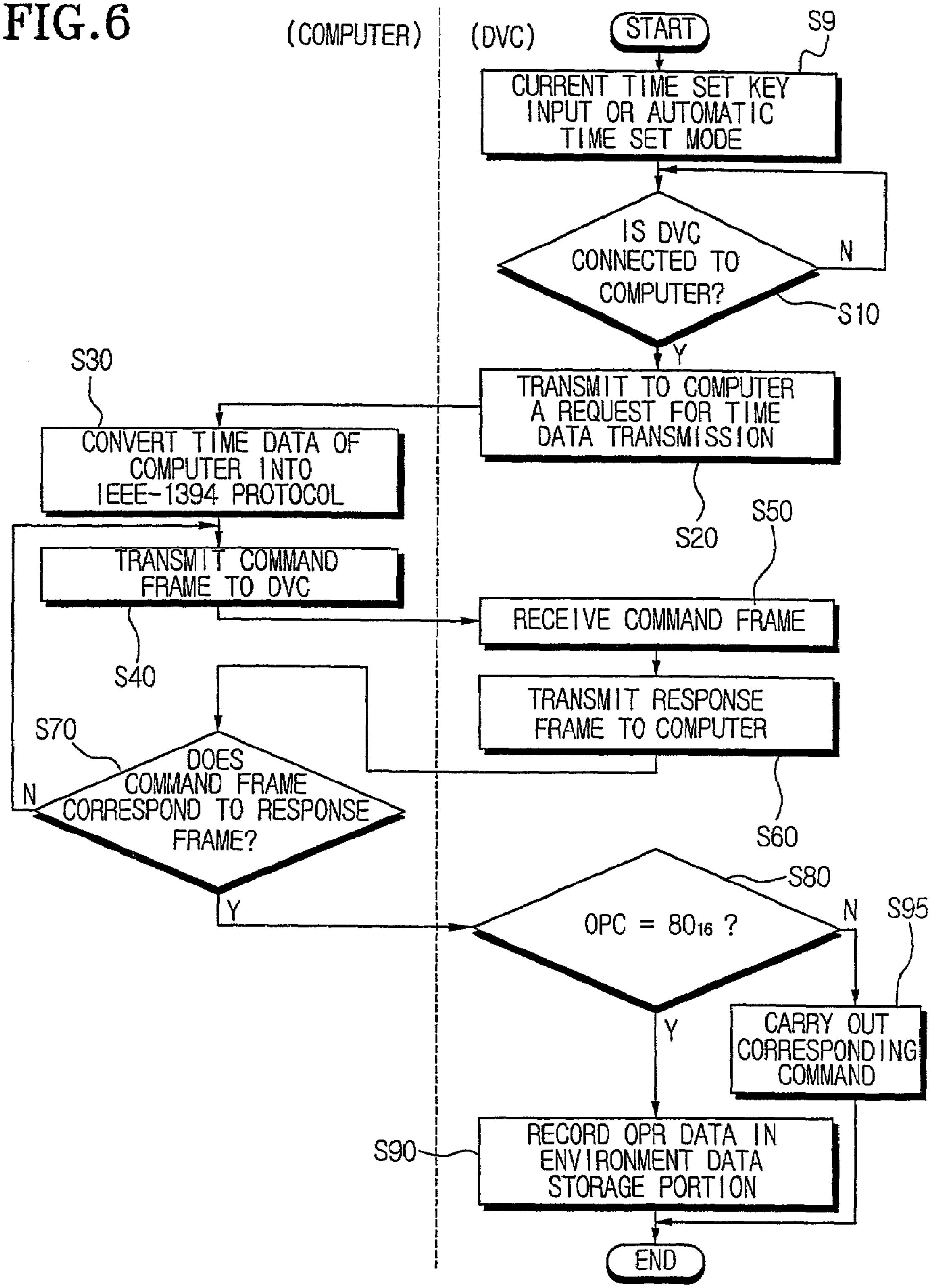
FIG. 6 is a flowchart of an environment setting method according to the present invention.

An exemplary method for setting environment of a DVC according to the principles of the present invention will now be described with reference to FIG. 6.

Where a user presses a predetermined key on the key input portion 85 to set current time in the DVC 100, or where the DVC 100 is set in an automatic time setting mode at operation S9, the microcomputer 90 in the DVC 100 checks through the digital interface 40 to see whether the DVC 100 is connected to the computer 200 at operation S10, and if a determination is made that the DVC 100 is connected to the computer 200, DVC 100 transmits a command requesting the time data transmission to the computer 200 to receive the data for the current time at operation S20. The computer 200 converts the time data of the computer 200 to meet the communication protocol, e.g., the IEEE-1394 protocol at operation S30. That is, the computer 200 converts the time data into the command frame of FIGS. 3 and 5 according to the IEEE-1394 protocol, and transmits the converted frame to the DVC 100 at operation S40. At transmission time, the command for time data setting is contained in the OPC field, while the time data is contained in the OPR field.

The microcomputer 90 in the DVC 100 receives the command frame through the digital interface 40 at operation S50, and transmits a response frame corresponding to the command frame to the computer 200 at operation S60. The computer 200 determines at operation S70 whether the response frame contains the content corresponding to the command frame the computer 200 has transmitted. Where a discrepancy between the command frame the computer 200 transmitted and the response frame received from the DVC 100 is determined, the computer 200 takes corrective measures, such as for example, returning to operation S40 and re-transmitting the command frame to the DVC 100, or the like.

The DVC 100 analyzes the OPC of the command frame at operation S80. If the OPC contains '$80_{16}$' corresponding to the time setting command, the microcomputer 90 sets current time by extracting data from the OPR and storing the extracted data in the environment data storage portion 95 at operation S90 (step S90). If the OPC contains a code other than '$80_{16}$', the DVC 100 performs an operation corresponding to the command indicated by the received code at operation S95.

As described above with reference to FIG. 1, in an embodiment of the present invention, the computer 200 is connectable to a time server 230 that provides standard time data via the Internet 220. The computer 200 downloads the standard time from the time server 230 using a known data downloading process, e.g., by using the TCP/IP, FTP protocols or the like. If the time data stored in the computer 200 does not correspond to the standard time of the time server, the computer 200 downloads the standard time from the time server 230 and then transmits the downloaded standard time to the DVC 100. Finally, in step 90, the data representing the current time previously stored in the environment data storage portion 95 is replaced by the time data received newly from the computer 200, and accordingly, the environment setting data of the DVC 100 is updated.

The microcomputer 90 of the DVC 100 counts a current time based on the updated time data by using an internal clock. Accordingly, after the update of the time, the microcomputer 90 displays a current time outside of the DVC 100 or use the updated time for other purposes. In this manner, the time maintained by the microcomputer 90 is more accurately synchronized with the time of the computer 200 and/or with the standard time provided by the time server 230.

The DVC 100 uses the updated time data for recording 'the time stamps' on the magnetic tape 80. The DVC 100 also records types of information other than the video/audio data on the magnetic tape 80. Time data is one example of the additional data recorded on the magnetic tape 80. Before explaining the mechanism by which the time data is recorded on the magnetic tape 80, a structure of the magnetic tape 80 will first be described.

Figure 7:
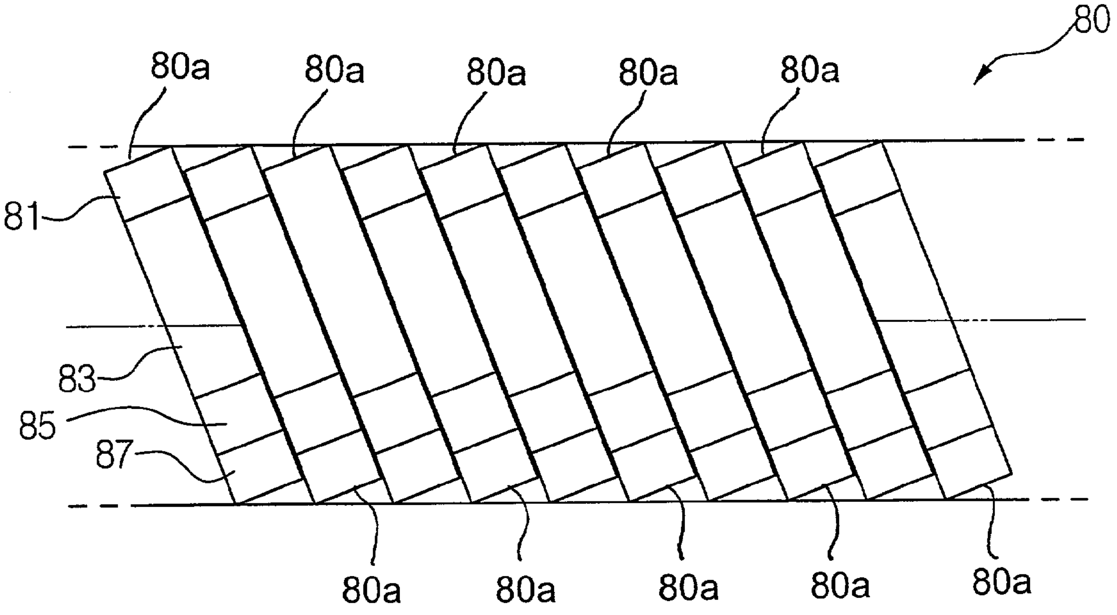
FIG. 7 is a view showing a structure of a magnetic tape, for explaining an example of application of data utilization by the environment setting method according to the present invention.

FIG. 7 is a view showing a part of a 6 mm DVC magnetic tape 80. The magnetic tape 80 has a plurality of tracks 80*a* inclining at a predetermined angle relative to a traveling direction. Each track 80*a* comprises four (4) sectors, i.e., a subcode sector 81, a video sector 83, an audio sector 85 and an insert and track information (ITI) sector 87.

The subcode sector 81 records information representing the date, the time and the index information, while the ITI sector 87 records track information. The video sector 83 records signals representing the video images, while the audio sector 85 records signals representing the sound.

Where an image and/or sound is recorded on the magnetic tape 80, the microcomputer 90 drives the head 70 and the mechanical-driving portion 30 to record the data inputted through the camera interface 20 on the video sector 83 and the audio sector 85 of the magnetic tape 80 while simultaneously recording corresponding data on the subcode sector 81 and the ITI sector 87. The relevant data stored in the environment data storage portion 95 is used as the time data to be recorded on the subcode sector 81. That is, by using the updated time data stored in the environment data storage portion 95, the microcomputer 90 continuously counts the current time accurately, and records the counted current time on the subcode sector 81 using the head 70. Accordingly, the DVC 100 provides accurate time, and also an accurate time stamp for the recorded images during the operations of DVC 100.

As described above, the present invention is explained in the context of transmitting time data as an example of the process of transmitting the environment setting data. However, transmitting time data is only an example of an application of the present invention, and accordingly, other environment setting data may also be transmitted from the computer 200 to the DVC 100. In addition, a separate dedicated program may be incorporated in the computer 200 to provide commands and data for the environment setting of the DVC. For example, by employing a special-purpose program in the computer 200 that is executed by the computer 200 to enable setting of environment for the DVC 100 from the computer 200, the user may conveniently input the environment setting data directly to the computer 200 using the more convenient input interface of the computer 200. The inputted data are transmitted to the DVC 100, and stored in the environment data storage portion 95 through the processes as described above.

Alternatively, the user accesses a special-purpose web site on the Internet for DVC environment setting, and downloads the environment setting data. In this case, the web site may provide a user interface menu, though which data for a variety of environment settings.

Although by way of example the embodiments of the present invention are described in reference to the IEEE-1394 protocol for exchange of data, other types of protocols and/or interfaces may also be used without departing from the spirit of the present invention. For example, it should be readily apparent to those skilled in the art that an RS-232C, a USB, or a wireless communication interface may also be used.

As can be appreciated, according to the present invention, by providing an interface between the DVC 100 and the computer 200 for a mutual data transmission, data for environment settings is easily inputted to the DVC 100 through the computer 200. As a result, the environment of the DVC 100 can be conveniently set without requiring the complicated manipulation of the key buttons on the DVC 100.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of setting an environment for a portable data storage device that has an interface for interfacing with a host computer thereby enabling a mutual data transmission with the host computer, the method comprising:

assigning one or more environment setting command code in a reserve code area that is not in use, the mutual data transmission between the portable data storage device and the computer being performed by exchange of a command frame via the interface, the command frame having an operation code area and an operand area;

determining whether a code contained in the operation code area of the command frame received from the computer is one of the one or more environment setting command code; and if the code contained in the operation code area of the command frame is one of the one or more environment setting command code, updating environment setting data stored in the portable data storage device with the environment setting data contained in the operand area of the command frame, wherein the environment setting command code comprises a time setting command code, and the environment setting data comprises time data representing a current time.

2. The method of claim 1, wherein the time data is standard time data downloaded to the computer from a time server.

3. The method of claim 1, wherein said portable data storage device comprises a digital video camcorder, said method further comprising:

recording the time data in a time recording sector of a magnetic tape during operation of the digital video camcorder.

4. A method of recording time on a digital video camcorder that interfaces with a computer to enable mutual data transmission with the computer, the method comprising:

assigning a time setting command code to at least one code in a reserve area of a communication protocol;

receiving an operation code area and an operand area in a command frame of the communication protocol from the computer, the operation code area containing the time setting command code, and the operand area containing time data corresponding to the time setting command code;

counting current time in the digital video camcorder based on the time data contained in the operand area; and recording the current time on a predetermined part of a magnetic tape during a recording operation of the digital video camcorder.

5. The method of claim 4, wherein the time data is standard time data downloaded via the Internet to the computer from a time server that provides the standard time.

6. A digital video camcorder, comprising:

an interface for communicating with an external host computer;

a microcomputer configured to count a current time based on time data transmitted from the external host computer; and a head for recording audio/video data on a magnetic tape, said head recording the current time on a predetermined part of the magnetic tape.

7. The digital video camcorder of claim 6, further comprising:

a storage portion for storing the time data.

8. The digital video camcorder of claim 6, wherein the time data is standard time data downloaded via the Internet to the computer from a time server that provides the standard time.

9. A method of providing a time reference for a digital video camcorder, comprising:

providing an interlace which exchanges data between the digital video camcorder and a computer using a predetermined communications protocol;

transmitting an updated time and a time set command from the computer to the digital video camcorder in a command frame of the communications protocol;

storing the updated time in the digital video camcorder in response to the time set command; and counting time within the digital video camcorder beginning with the stored updated time.

10. The method of claim 9, wherein the data protocol is an IEEE-1394 protocol.

11. The method of claim 9, wherein the method further comprises:

providing an internet connection between the computer and a time server; and securing the updated time from the time server.

12. A digital video camcorder, comprising:

a camera which senses audio and visual information and converts the audio and visual information to first digital data;

a microcomputer which controls the digital video camera;

an interlace which communicates second digital data from an external computer to the microcomputer, the second digital data comprising at least one command for setting an environment parameter of the digital video camcorder and an associated value for the at least one environment parameter; and a non-volatile memory which stores the communicated associated value, wherein the microcomputer controls the digital camera based on the communicated associated value, wherein:

the microcomputer generates third digital data based on the communicated associated value; and the digital video camcorder further comprises a head which records the first digital data and the third digital data on respective predetermined areas of a recording medium.

13. A digital video camcorder, comprising:

a camera which senses audio and visual information and converts the audio and visual information to first digital data;

a microcomputer which controls the digital video camera;

an interface which communicates second digital data from an external computer to the microcomputer, the second digital data comprising at least one command for setting an environment parameter of the digital video camcorder and an associated value for the at least one environment parameter; and a non-volatile memory which stores the communicated associated value, wherein the microcomputer controls the digital camera based on the communicated associated value wherein:

the communicated associated value is time data;

the microcomputer counts a current time based on the time data; and the digital camcorder further comprises a head which records the first digital data and the time data on respective predetermined areas of a recording medium.

14. The digital video camcorder of claim 12, wherein the at least one command for setting an environment parameter of the digital video camcorder and the associated value for the at least one environment parameter are communicated in a reserved area of a command frame of a predetermined communications protocol.

15. The digital video camcorder of claim 14, wherein the predetermined communications protocol is an IEEE-1394 protocol.

16. The digital video camcorder of claim 14, wherein the predetermined communications protocol is an RS-232 protocol.

17. The digital video camcorder of claim 14, wherein the predetermined communications protocol is an USB protocol.

18. The digital video camcorder of claim 14, wherein the predetermined communications protocol is a wireless communications protocol.

19. A method of communicating instructions for setting an environment value of a digital camcorder using a computer, the method comprising:

assigning a first command code which identifies the digital video camcorder;

assigning a second command code to at least one reserve code area of a communication protocol, the second command code identifying the environment value to be set;

assigning the environment value relating to the second command code;

transmitting a command frame from the computer to the digital video camcorder, said command frame comprising at least the first command code, the second command code and the environment value; and setting the environment value based on the second command code and the environment value.

20. A method of updating an operational configuration setting of a portable data storage device from a host computer, the method comprising:

detecting a connection between said portable data storage device and said host computer;

transmitting from said host computer a command to update said operational configuration setting together with a update value of said operational configuration setting;

receiving by said portable data storage device said command and said update value; and storing within said portable data storage device said update value as a new value for said operational configuration setting, wherein said step of transmitting said command and said update value comprises:

assigning a command code representing said command, said command code being selected from among normally unused ones of a plurality of codes available in a communication protocol being employed for communications between said portable device and said host computer;

assembling a command frame comprising a command code field and an operand field, said command code field containing said command code, and said operand filed containing said update value; and sending said command frame from said host computer to said portable data storaae device using said communication protocol.

21. The method in accordance with claim 20, further comprising:

upon detection of said connection, transmitting a request from said portable data storage device to said host computer for said update value of said operational configuration setting; and upon receipt of said update value, transmitting from said portable data storage device to said host computer an acknowledgement message indicating safe receipt of said command and said update value.

22. A method of updating an operational configuration setting of a portable data storage device from a host computer, the method comprising:

detecting a connection between said portable data storage device and said host computer;

transmitting from said host computer a command to update said operational configuration setting together with a update value of said operational configuration setting;

receiving by said portable data storage device said command and said update value; and storing within said portable data storage device said update value as a new value for said operational configuration setting, wherein said operational configuration setting comprises a current time setting, said method further comprising downloading by said host computer from a remote time server a standard time value, said step of transmitting said command and said update value comprises upon detection of said connection, automatically transmitting said command and said update value from said host computer to said portable data storage device without an intervention by a user of said portable data storage device.

23. A computer readable storage medium having stored thereon a set of instructions for implementing a method of updating an operational configuration setting of a portable data storage device from a host computer, said set of instructions comprising one or more instructions for:

detecting a connection between said portable data storage device and said host computer;

upon detection of said connection, transmitting from said host computer a command to update said operational configuration setting together with a update value of said operational configuration setting;

receiving from said portable data storage device by said host computer an acknowledgement message indicating safe receipt of said command and said update values, wherein:

said operational configuration setting comprises a current time setting of said portable data storage device, said one or more instructions for transmitting said command and said update value comprises one or more instructions for upon detection of said connection, automatically transmitting said command and said update value from said host computer to said portable data storage device without an intervention by a user of said portable data storage device.

24. The computer readable storage medium according to claim 23, wherein said one or more instructions for transmitting said command and said update value comprises one or more instructions for:

assigning a command code representing said command, said command code being selected from among normally unused ones of a plurality of codes available in a communication protocol being employed for communications between said portable device and said host computer;

assembling a command frame comprising a command code field and an operand field, said command code field containing said command code, and said operand filed containing said update value; and sending said command frame from said host computer to said portable data storage device using said communication protocol.

25. The computer readable storage medium according to claim 23, wherein said set of instructions further comprises one or more instructions for:

downloading by said host computer from a remote time server a standard time value.

26. A portable data storage device, comprising:

a memory for storing operational configuration setting of said portable data storage device;

an interface for connecting to and communicating with a host computer using a predetermined communications protocol, and for receiving from said host computer a command to update said operational configuration setting together with a update value of said operational configuration setting; and a microcomputer configured to control said memory and said interface to, upon receipt of said command and said update value, cause said received update value to be stored in said memory as a new value for said operational configuration settings wherein said microcomputer is further configured to decode said received command and said received update value, said command being received as a command frame, said command frame comprising a command code field and an operand field, said command code field containing a command code representing said command, and said operand filed containing said update value, said command code being selected from among normally unused ones of a plurality of codes available in a communication protocol beinci employed for communications between said portable device and said host computer.

27. The portable data storage device according to claim 26, wherein:

said microcomputer is further configured, upon detection of said connection to said host computer, to transmit to said host computer a request for said update value of said operational configuration setting, and, upon receipt of said update value, to transmit to said host computer an acknowledgement message indicating safe receipt of said command and said update value.

28. The portable data storage device according to claim 26, wherein:

said operational configuration setting comprises a current time setting.

29. The portable data storage device according to claim 26, wherein:

said portable data storage device comprises a digital video camcorder.

30. The portable data storage device according to claim 26, wherein:

said portable data storage device comprises a personal digital assistant.

31. The portable data storage device according to claim 26, wherein:

said portable data storage device comprises a portable music player.

32. The portable data storage device according to claim 26, wherein:

said predetermined communications protocol is an IEEE-1394 protocol.

33. The portable data storage device according to claim 26, wherein:

said predetermined communications protocol is an RS-232 protocol.

34. The portable data storage device according to claim 26, wherein:

said predetermined communications protocol is a USB protocol.

35. The portable data storage device according to claim 26, wherein:

said predetermined communications protocol is a wireless communications protocol.

36. The portable data storage device according to claim 26, wherein:

said memory is a non-volatile memory.

* * * * *

UNITED STATES PATENT AND TRADEMARK OFFICE

CERTIFICATE OF CORRECTION

PATENT NO. : 7,187,403 B2 
APPLICATION NO. : 10/061347
DATED : March 6, 2007
INVENTOR(S) : Dong-youp Gu et al.

It is certified that error appears in the above-identified patent and that said Letters Patent is hereby corrected as shown below:

Column 9, Column 47, change “interlace” to --interface--.

Colum 10, Line 2, change “interlace” to --interface--.

Column 10, Line 33, change “value” to --value,--.

Column 11, Line 37, change “storaae” to --storage--.

Column 11, Line 63, after “wherein” insert --:--.

Column 12, Line 21, change “values,” to --value,--.

Column 12, Line 67, change “settings” to --setting,--.

Column 13, Line 10, change “beinci” to --being--.

Signed and Sealed this

Third Day of July, 2007

JON W. DUDAS
*Director of the United States Patent and Trademark Office*